United States Patent [19]

Schifferly

[11] 4,403,640
[45] Sep. 13, 1983

[54] TIRE MOUNTING COMBINATION TOOL

[76] Inventor: Richard E. Schifferly, 9717 Waterville-Neapolis Rd., Waterville, Ohio 43566

[21] Appl. No.: 282,728

[22] Filed: Jul. 13, 1981

Related U.S. Application Data

[63] Continuation-in-part of Ser. No. 104,741, Dec. 18, 1979.

[51] Int. Cl.³ .................................. B60C 25/04
[52] U.S. Cl. ................................................ 157/1.3
[58] Field of Search ............... 157/1.22, 1.17, 1.1, 157/1.3, 1.24; 29/110, 110.5, 116 R, 122–125, 130

[56] References Cited

U.S. PATENT DOCUMENTS

| | | | |
|---|---|---|---|
| 2,421,856 | 6/1947 | Teegarden | 157/1.22 |
| 2,569,789 | 10/1951 | Weaver | 157/1.24 |
| 3,029,860 | 4/1962 | Schultz et al. | 157/1.22 |
| 3,100,011 | 8/1963 | Lydle | 157/1.22 |
| 3,823,756 | 7/1974 | Rainey | 157/1.3 |
| 4,107,830 | 8/1978 | Thomson | 29/110.5 |
| 4,180,122 | 12/1979 | Sevastakis | 29/116 R X |

FOREIGN PATENT DOCUMENTS

| | | | |
|---|---|---|---|
| 569870 | 2/1959 | Canada | 157/1.22 |
| 456097 | 8/1913 | France | 157/1.22 |

*Primary Examiner*—James G. Smith
*Attorney, Agent, or Firm*—George R. Royer

[57] ABSTRACT

An automatic or manually operated tire mounting tool adapted primarily for mounting flexible tires on rims of various sizes and configurations. Such device is comprised of an elongated longitudinally extending working arm with two working ends for mounting and demounting purposes respectively, one end of which supports a vertically disposed rotatably mounted working roller, which roller assists in and facilitates the mounting process, and wherein said mounting arm is equipped on its mounting end with a hooked shaped positioning tong to assist in the mounting process.

3 Claims, 10 Drawing Figures

TIRE MOUNTING COMBINATION TOOL

DISCUSSION OF PRIOR ART AND BACKGROUND OF INVENTION

This application is continuation-in-part of my copending application, Ser. No. 104,741 filed Dec. 18, 1979.

As is well known in the art, the process of automatically mounting pneumatic tires on rims, in a singular, non-sequential process, is generally consummated by various tools and machines, some of which are automatic or semi-automatically actuated, while others are completely manual in operation. Whatever the actuation means, this process of tire mounting involves, among other matters, the step of removing the original defective or used tire from the rim, once deflated, and generally removing this deflated tire from the metal rim. This step of removing the tire from the inside of the rim involves, among other aspects, the problem of keeping the mounting tool from damaging the bead of the tire in this demounting or mounting process. On the one hand, in the mounting process, the problem of damage to the tire bead is even more acute than in the demounting process. Obviously, damage to the tire bead can cause critical problems with the tire, and it is therefore essential that some means be used to protect the tire bead against damaging frictional pressures in this mounting process.

There have been a number of manually or semi-automatically operated tools or devices used in the tire demounting and mounting process. All such known tools have been structed in such a manner so as to potentially cause tire bead damage in the mounting process, as more particularly described below. In using any such tool for demounting, the tire is temporarily stretched by the tool so that the tire can be more easily removed from the rim in a circumferential manner with said stretching force then being released as the tire becomes removed. Similarly, the tire is stretched circumferentially during the mounting process with the tire bead absorbing most of the damaging frictional pressure. In this latter regard, all known tire mounting tools have static working surfaces, and such static mounting surfaces are difficult to manipulate. Thus, when such a tool is drawn around the inside tire circumference, the tire frequently is forcibly pulled over bare metal on the rim periphery and as the tire is forcibly pulled over bare metal this requires thereby more force and energy in the mounting process which can and does damage tire beads. Also, such known tire mounting tools, with static mounting surfaces consume relatively too much time in the mounting process, because of the aforesaid resultant resistance in the mounting process.

The subject invention herein is directed to the end of overcoming the foregoing problems in the art of tire mounting on metal rims and the following objects are directed accordingly.

OBJECTS

In view of the foregoing discussion of the prior art, the following are objects of the subject invention:

It is an object of the subject invention to provide an improved tire mounting tool;

it is also an object of the subject invention to provide a tire mounting and demounting tool which incorporates means to prevent or alleviate damage to the bead and other portions of the tire during the tire mounting or demounting procedures;

yet another object of the subject invention is to provide a tire mounting tool which incorporates means to prevent or alleviate damage to the bead and other portions of the tire during the tire mounting procedure;

yet another object of the subject invention is to provide an improved process of tire mounting;

yet another object of the subject invention is to provide a tire mounting tool which is flexible and versatile in adaptation for mounting tires on rims of all shapes;

a further object of the subject invention is to provide a tire mounting apparatus which incorporates roller means as an integral part of the functional end to facilitate the mouting procedure;

a further object is to provide a device to mount tires which does not damage the tires;

another object of the subject invention is to provide a more efficient and effective tool for mounting a tire on a rim;

yet another object of the subject invention is to provide a novel roller type mounting tool for use in tire mounting operations;

still another object is to provide an improved device for semiautomatically mounting tires;

an additional object of the subject invention is to provide improved and relatively more versatile tire mounting tool;

another object of the subject invention is to provide an improved tire mounting and demounting tool;

a further object of the subject invention is to provide an improved apparatus for the mounting of a tire on a metallic rim, which does not exert excessive distortion pressure on the tire bead;

still another object of the subject invention is to provide an improved process for mounting tires during the tire remounting process;

a further object of the subject invention is to provide a tire mounting apparatus which does not pressure the toe of the tire's bead during the mounting process;

another object of the subject invention is to provide an improved tire mounting apparatus and process;

other and further objects of the subject invention will become apparent from a reading of the following description taken in conjunction with the drawings.

DESCRIPTION OF GENERAL EMBODIMENT

In describing the subject tire mounting tool, consideration must first be given to certain basic operational principles which are commonly employed in the mounting of tires onto metallic rims. In this regard, the tire rim is generally first placed horizontally on the upper surface of a fixedly mounted air powered tire mounting machine. In most such machines, integrally affixed on such upper surface is a vertically disposed positioning tang, over which is fitted a longitudinally disposed slot disposed in the tire mounting tool. Moreover, in the center of the working base on the tire mounting machine is a removable, tapered locking cone, which fits through the center opening in the rim, and which cone is screwed downward on the pinion tang after the rim is positioned. The rim is locked in position relative to the upper base of the machine when the locking cone is screwed downwardly over the vertical positioning tang. On the upper surface of the mounting machine is a contoured base so that the inner diameter of the rim can fit conformingly therein, thereby facilitating the process of holding the rim on such upper base. A vertical stabilizing pin holds the rim from lateral movement.

The subject tire mounting tool incorporating the invention herein, as used in the foregoing described mounting process, is a longitudinally extending member with a centrally disposed and longitudinally extending slot extending down the middle shank portion of said tool. The one end of the tool serves basically as a combined demounting end and handle member to be grasped manually to help implement and manipulate the tool in its specific operation. The opposite end of the tool is the functional or mounting end upon which are integrally affixed the primary functional elements of the tool used directly in the tire mounting process. Specifically, mounted on the upper surface of the mounting end is a circular mounting roller integrally positioned for rotatable movement on a fixed shaft, the latter shaft projecting vertically upward from the upper surface. The roller is thus adapted to rotate freely about the vertical shaft in a clockwise or counterclockwise direction about an axis which is substantially perpendicular to the upper surface of the mounting end of the tool. The roller can be positioned in a symmetrically disposed position on the longitudinal central axis of the tool member or in certain preferable embodiments, such roller can be positioned with the center of the fixed shaft slightly off center or displaced from said longitudinal central axis, as more fully described below.

Once the rim is so positioned on the contoured base of the machine, as described above, the tire is placed over the top of the rim at an angle to the horizontal with the far or forward portion of the tire positioned upwardly and slightly angle centered, and such that one part of such tire is positioned into the near rim well extremities and the opposite part of the tire above the top of the rim, inclined upwardly. The next step is to insert the longitudinal slot of the mounting tool over the vertically disposed positioning tang on the upper base of the tire mounting machine, and concurrently place the mounting end of the tool so that the gripping tong is hooked downwardly near the closest exposed side of the upper rim circumference, with the mounting roller engaged on the tire nearby the lower tire bead on the inside part of the tire. Thereupon, the lower inside angle bead of the tire is engaged by the front upper tong on the tool and actuation of the air foot pedal commences rotation of the mounting tool in a left to right, or counterclockwise, movement to mount the entire circumference of the lower bead of the tire inside the two rim extremities. Once the entire lower tire bead is so mounted, the mounting tool movement is automatically reversed to a clockwise movement, in this same tool disposition, to its original starting position and the same process is repeated to mount the upper tire bead. In this regard, the mounting tool is used for mounting the lower and upper tire beads, with the roller engaging the outside surface of the tire near the upper bead.

While the subject tool is moved circumferentially about the rim, the roller on the mounting end is designed to engage the tire by pressing down on a portion thereof, without directly engaging or damaging the toe bead of the tire; and as the roller moves around the rim of the tire, it moves the lower tire bead down inside the rim on its first arcuate sweep. On the second arcuate sweep for mounting the upper tire bead, the roller engages the upper outside part of the tire adjacent the bead and presses same downwardly so as to mount the upper tire bead on the rim, in similar fashion to the process used on the lower bead. In each case, the roller serves to keep the tire bead radially outward from the tire rim in order to prevent damage to the bead of the tire, and this evolution is consummated without direct pressure of a damaging degree on the bead.

Relative to the general construction and operation of the basic roller member, it is to be noted that as mounting end of the roller is lowered to the metal rim, the outer peripheral surface of the roller helps position the tire bead, so that the tire can fit around the inside of the tire rim in this mounting process. This roller member also functions to hold downwardly the trailing edge of the tire bead and keep said trailing edge in such downward position while the mounting process is being consummated. Concurrently to this hold down process, the leading edge of the roller rides against the tire just immediately radially outward of the tire bead and in the process serves to force this portion of the tire both downwardly and outwardly such that the tire is fitted inside the rim but also downwardly below the upper exposed rim. Once the both beads of the tire are in place about the rim, the inflation process is executed to complete the mounting cycle. Once the tire is so installed about the rim, the mounting tool is removed from the tang post.

In order to provide a desirable leverage for the roller, the mounting end of the tool can be angled slightly relative to the main shank of the tool, so that a portion of the bottom of the mounting end lies above the upper surface of the tire rim. By this angling relationship the mounting roller is enabled to function in a horizontal stance, which is its most optimal working position and which is important to the functional design of the roller and its outwardly rotational movement. This latter positional relationship is also significant to the functional rotational movement of the roller as more fully described hereinbelow.

DESCRIPTION OF PREFERRED EMBODIMENT

Referring now to the drawings in which a preferred embodiment is shown, it must be emphasized that the embodiment shown in the drawings and described herein is only one specific embodiment, and that the subject invention encompasses several possible embodiments, not all of which can be described herein. Therefore, description of a preferred embodiment herein shall not be considered as delimiting the general scope of the subject invention, as set forth in the claims hereto, as other embodiments and variations are envisioned.

Moreover, in describing the preferred embodiment of the subject invention, the following reference nomenclature will be used; first, the word "lower" will refer to those areas of the subject tool that are disposed downwardly towards floor level when the tool is in its intended use position, while the word "upper" will refer to those portions or surfaces of the tool lying thereabove. The word "vertical" will be used in reference to those structures that are oriented substantially up and down above the upper surface of the tool while resting in a horizontal or working position. The word "horizontal" will be used in reference to those structures which are generally disposed in a direction perpendicular to the vertical orientation. The term "longitudinal central vertical axis" will refer to that axis of the working end, which axis extends vertically upward and downward through the center of the object described when viewed from a side elevational view. Moreover, the words "horizontal central axis" will refer to that axis which extends horizontally and symmetrically through the center shank of the subject tool member, as viewed from an elevational view.

Figure 1:
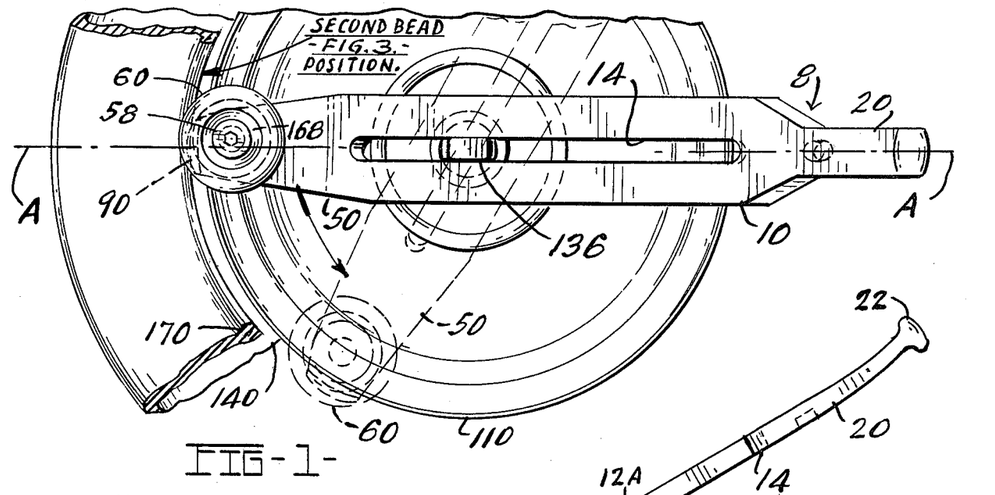
FIG. 1 is a top elevational view of the tire mounting device incorporating the subject invention.
Figures 2, 3, 4:
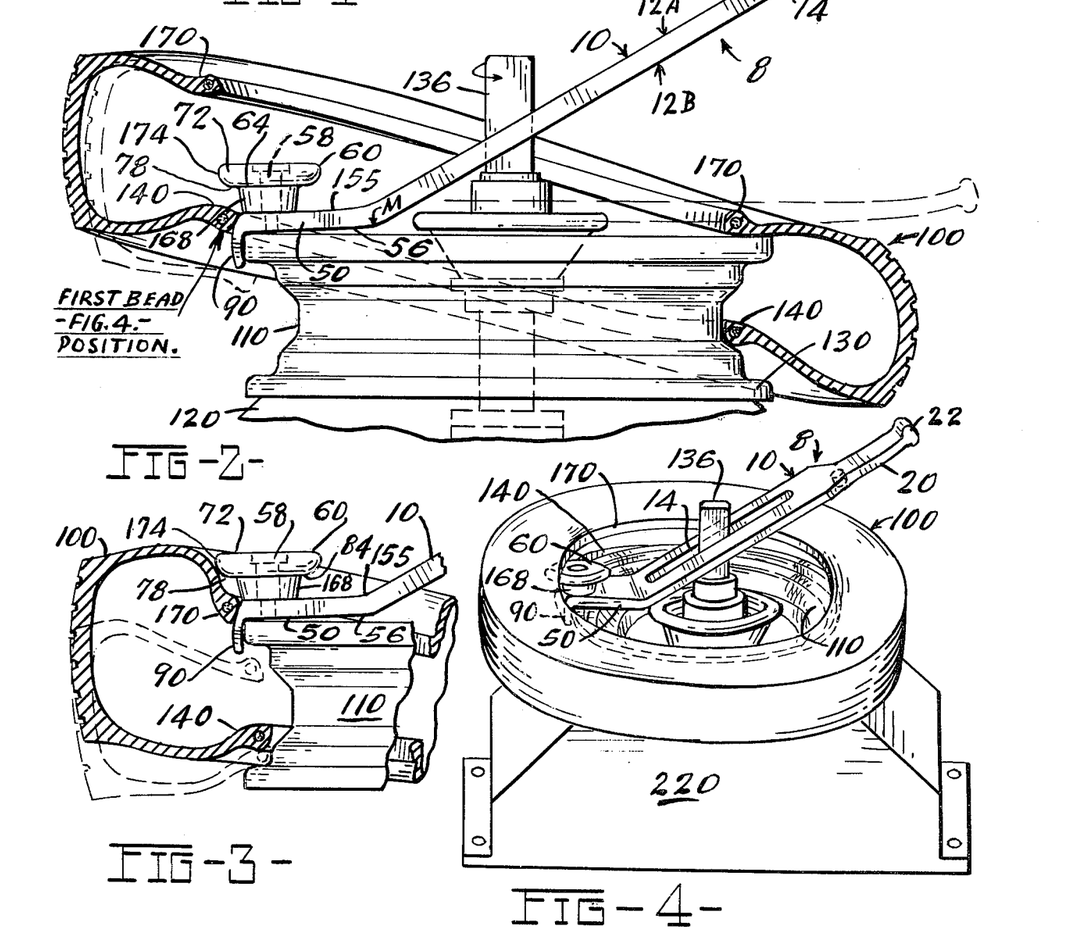
FIG. 2 is a side elevational view of the tire mounting tool shown with the tire mounting roller disposed on top of the mounting end thereof and showing the tire mounting roller in operational configuration relative to the tire rim as mounting the lower tire bead.
FIG. 3 is a side elevational view of the subject tire mounting tool, showing the tire mounting roller in mounting configuration relative to the upper tire bead.
FIG. 4 is a perspective view of the subject mounting tool.

As represented in FIGS. 1 and 2, the subject tool member 8 is comprised in part of a longitudinally extending arm 10. Said arm member 10 serves to join the demounting end 20 (also referred to as the handle end 20) with the mounting end 50, with such respective ends disposed on opposite extremes of the working arm 10, as shown. The base arm member 10 is preferably a metallic member of rigid construction having an upper surface 12A and a lower surface 12B with the mounting end 50 and the handle end 20 disposed in general along the same longitudinal central axis A—A, as viewed from a top elevational view, as shown in FIG. 1. In the preferred embodiment, the working arm 10 is angled or bent along the longitudinal central axis A—A, as represented in FIG. 2 at a point along the base member 10 somewhat near the mounting end 50. More particularly, when viewing the mounting arm from a side elevational view as shown in FIG. 2, the mounting arm has a bend along its longitudinal extent, such bend being preferably in a position which is closely adjacent to the mounting end. In the preferred embodiment, the bend is such that the bend point M is a relatively short distance from the extreme end of mounting end on arm 10. The precise distance from mounting end 50 that this angle is effected can vary in accordance with the specifications of the manufacturer or user. The remaining portion of the base arm member 10 between said angle point and demount end 20 is inclined upwardly at an angle of about thirty degrees relative to the horizontally disposed mounting end 50, as indicated in the drawings. This latter degree of flexure in the base arm member 10 is not critical as any degree of flexure may be utilized, as desired, just as the location of the angle may vary, as desired. This flexure or bend enables the user to gain additional leverage in the use of tool 8 and helps to place the upper surface of the working end in a more optimal working position, as more fully described below.

In the embodiment shown in the drawings, particularly that shown in FIG. 1, the rigid longitudinal arm 8 has a longitudinally extending slot 14 extending along the axis A—A as shown in FIG. 1. Said longitudinal slot 14 extends completely through the arm 10, from the upper to the lower surfaces as represented in FIGS. 1 and 4. More particularly as shown in the drawings, the slot 14 creates a longitudinally extending opening which reaches completely from the upper surface of the arm to the lower surface. Such latter constructional arrangement with such slot 14 is used as a positioning mechanism to keep the arm 8 centered about the vertical position tang 136, as described below.

The demounting end 20 of the tool 8 serves also as a handle end, as evidenced by the structure of such demounting end 20. A bulbular extension 22 on the extreme end of such demounting end is the main working element for demounting whenever such end 20 is used in the evolution of demounting a tire from a rim. In some embodiments, the structure, as shown, for the demounting end 20 with the affixed bulbular member 22, is conventional, for tire mounting tools of the general classification to which the subject mounting tool 8 belongs.

Referring now to the mounting end 50, this end has an upper surface 155 and a lower surface 56. Fixedly and integrally mounted on the upper surface 155 is a vertically extending shaft member 58. More particularly shaft member 58 is embedded and otherwise rigidly supported in integral fashion into the upper surface of the mounting end 50, as shown in FIG. 2. In the preferable embodiment of the subject invention it is considered optimal to have the center of the shaft 58 mounted slightly off center from the longitudinal central axis A—A as shown in FIG. 1, as this off-center position is optimal for effective tire mounting purposes.

Mounted on such fixed shaft member 58 is a freely rotatable roller member 60, which serves as the main functional unit of the subject tool in the mounting procedure.

Relative to the construction of the basic roller member, the uppermost shoulder on the roller member is larger in diameter than the basic roller diameter. As the mounting end 50 is lowered to the metal rim, this upper shoulder functions to help position the tire bead (the internal diameter of the tire) so that the tire can fit around the inside of the tire rim. This enlarged shoulder 72 also functions to hold the trailing edge of the tire bead and keep said trailing edge down while the process evolves in mounting the tire. Immediately beneath the enlarged roller diameter 72 is a radially inwardly sloping shoulder with a diameter smaller than the enlarged or largest diameter of the roller. This radially inwardly sloping shoulder is rounded in a slightly convex fashion as it curves or slopes radially inwardly. The leading edge of this shoulder rides against the tire just inside of the bead, and by reason of its convex, tapered peripheral contour, serves to force this portion of the tire downwardly and outwardly such that the tire is fitted outside the rim but also downwardly below the upper exposed rim. The lower portion of roller 60 is also slightly tapered to a smaller diameter as it extends downwardly to its lower most extreme, and moreover, the lower shoulder has generally straight linear sides on its peripheral surface, as viewed in cross section. Functionally, the lower portion rides against the inside of the tapered bead of the tire without impinging or pressurizing the bead and causing any damage thereto, and serving to keep the tire bead away from the tire rim during the mounting process. The specific structure of this roller assembly as used in the preferred embodiment of the subject invention is described hereinbelow.

Figure 5:
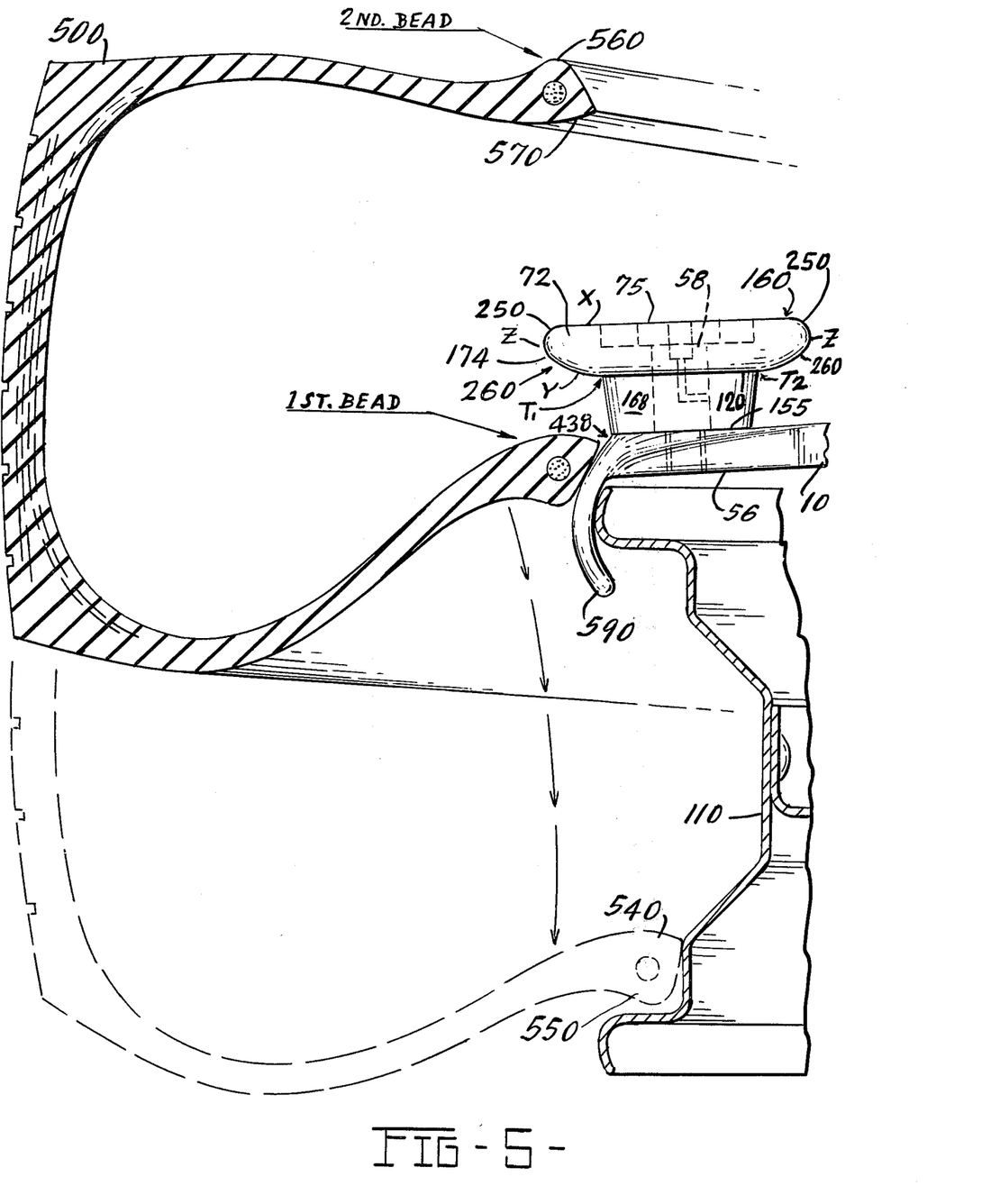
FIG. 5 is an enlarged side elevational view of the mounting roller shown in FIG. 2 shown as mounting the lower tire bead.

Referring now to the drawings, the particular roller 60, shown in FIGS. 3 and 5, has an upper portion 72 and lower portion 168, with the reference perspectives of the upper and lower orientation shown in the drawings. The lower portion 168 of the roller 60 is formed in the shape of an inverted truncated cone, such that the upper part of the lower portion 168 has a greater diameter than the lower part thereof, as shown in the drawings. As seen, the vertical sides of the lower portion 168 of roller 60 are linear, while the upper and lower horizontal surfaces are generally flat. The lower surface of the lower portion 168 of roller 60 thus abuts against the upper surface 155 of mounting arm 10, but with sufficient clearance so as not to touch against such upper surface of arm 10 as it rotates.

The upper portion 72 of the roller 60 is formed as a circular member, which is wider in comparison to the lower portion 168 of such roller. As seen, the upper portion 72 has a lower surface 120 which is partially flat and integrally abuts or rests against the upper surface of the lower portion 168 of roller 60, as shown. Additionally, the upper surface 75 of the roller 60 is also generally flat, while the laterally disposed or peripheral circumferential surface 174 of the roller 60 is convex, as viewed in cross-sectional configuration in FIGS. 2 and 5. As can be seen in FIGS. 2 and 5, and as stated above, in the one preferred embodiment of the invention, the upper portion 72 of the roller 60 is greater in diameter than the upper part of the lower portion 168; and in this preferred embodiment of the subject invention, such diametric difference is of such magnitude that a portion of the lower undersurface 120 of the upper portion 72 projects a minimal distance out beyond the upper part of the lower portion 168, as shown in the drawings. With this characteristic, the lower undersurface 120 of the upper portion 72 of roller 60 and the sides of lower portion 68 form a distinct cleavage and break at $T^1$ and $T^2$ as shown in the cross-sectional views of the rollers shown in the drawings, in FIGS. 5 and 6.

Figure 6:
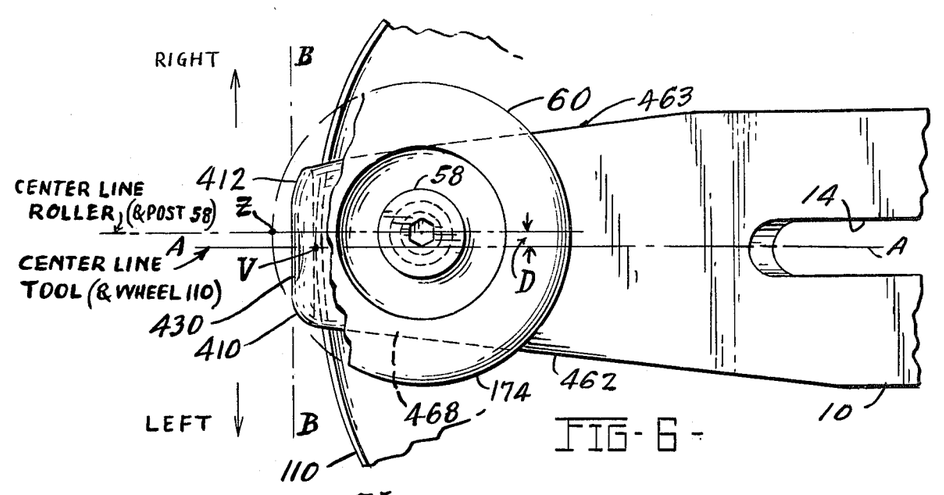
FIG. 6 is an enlarged top elevational view of the tire mounting roller.

The circumferential peripheral surface 174 of the upper portion 72 of roller 60 is convex all around its edge, as seen in the cross-sectional view of FIGS. 2 and 5. This circumferential surface 174, as shown particularly in FIGS. 5 and 6, is formed with a double radius, with the upper radius 250 of formation of convex surface 174 being distinct from the lower radius 260 of formation, as viewed from such cross-sectional perspectives.

More specifically, as shown in FIG. 5, the lower radius 260 of convex shoulder 174, as viewed and formed from a cross-sectional perspective, is formed from an imaginative point of radius X located on the upper surface 75 of the roller 60, and as shown commences radially outwardly relative to the center of roller 60, at imaginative point Y, located at point $T_1$ or $T_2$ on the undersurface 120 of upper portion 72 of roller 60. Such radius of formation for lower radius 260 as shown in cross section, stops at the most peripheral point Z on the outer convex surface 174 of upper portion 72 of roller 60. It must be noted that point Z is an imaginative point that is existent all around the peripheral surface 174, as diagramatically designated in FIGS. 5 and 6, just as points X, Y, $T_1$ and $T_2$ are imaginative points all around the periphery of roller 60, but are visualized from such cross-sectional perspective shown in FIGS. 5 and 6. Thus, in essence, point Z is located on any portion of a cicle which is the greatest diametric extent of surface 174, and when viewed in cross-section, point Z becomes a point on each side of the view of upper part 72 of roller 60, as shown in FIGS. 5 and 6. On the other hand, the upper radius of formation 250 is commenced at point Z on peripheral surface 174, all around such peripheral surface, and is drawn from imaginative center point Y, as shown in FIG. 4 and extends up to a point where it meets the upper flat surface 75 of roller 60.

Center point Y, when observed in cross-section represents the commencement point of lower radius 260, which is a series of points in a circle around the lower surface 120 of roller 60 where the curved portion of surface 174 meets the upper peripheral surface of lower portion 168 of roller 60, as shown. The upper radius of formation 250 is preferably formed over a forty-five degree arc from point Z to where it meets the upper flat surface 75 of roller 60, as particularly seen in FIG. 5, and is the smaller radius of the two double radii 250 and 260. Lower radius 260 is preferably formed on a sixty-degree arc from point Y to point Z, wherein as stated, point Z is the largest diametric extent of the upper portion 72 of roller 60. Radius 260 meets and conforms at X into radius 250, forming on surface 174 the desired double radius that is important to the functional part of the roller 60, as desired to provide the proper roller pressure point. Thus, in viewing the upper part of roller 60 from any cross-sectional perspective, the above described double radii formation is evident. However, it must be stated that the double radii is not limited to the actual degree of formation discussed, so long as there is a double radius perspective when viewing the roller from any perspective, particularly a cross-sectional view. Thus, when viewing the roller 60 in a cross-sectional view, the upper convex surface 174 is formed by a distinct and different upper radius, as opposed to the lower one-half of such surface 174.

As can be seen from the foregoing discussion, the upper portion of roller 60 has an upper convex circumferential surface 174 formed by two and not one distinct radii. More particularly, the convex surface is so shaped that two separate radii 250 and 260 form such circumferential surface, on the outer periphery. This structural arrangement allows the roller to more optimally engage the respective tire beads, as desired for efficient mounting of the tire on rim 110, as shown in the drawings.

Relative to the foregoing described constructional configuration for the roller 60, such structural configuration is one possible configuration of several in this invention, and it must be stressed that in the optimal embodiment, the upper curved shoulder 74 of the roller is thus preferably of convex shape as shown in the drawings. This convex shape on the upper shoulder surface 174 in the preferred embodiment is thus rounded, with such double radii, as to tangentially press the tire downwardly and outwardly, as shown in the drawings. The convex shape enables upper shoulder surface 174 to direct two vector components on the impinging tire surface. First, there is a horizontally directed, radially outer component, and secondly there is a vertically downward component. These two directional components are resolved into one resultant directional component which is vectored downwardly and radially outwardly. This directional component enables the roller to impress tire, at a point just radially outward of the tire bead, to a position downwardly and outwardly beyond and below the tire rim for mounting purposes. This latter action in combination with the external circumferential surface of lower roller member 168 serves to impress and thereby direct the tire bead radially outwardly in order to prevent the tire bead and other tire portions from being damaged or scored by the metallic tire rim 110 during the tire mounting process.

Figure 7:
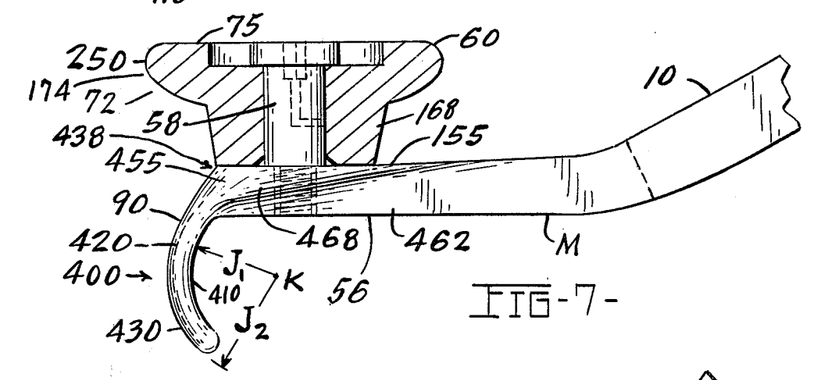
FIG. 7 is a side elevational view of the working end of the subject tool.

Referring now to FIGS. 6, 7, 8, and 9, the mounting end 50 on arm 10 of the tool 8, is structured in a unique manner so as to maximize the efficiency and operability of the tool. In this respect, as previously stated, the working end of the tool 8, is generally that portion or structure of arm 10 which is forward of the bend point M on arm 10, as shown in FIG. 7. The upper horizontal surface 155 of working end 50 generally extends without interruption over the upper surface 12A of arm 10 to an area where the arm 10 bends upwardly. Additionally, the lateral portion of the upper surface 155 of the mounting end 50 extends to the lateral sides 462 and 463 on the mounting end of arm 10, as represented in the drawings.

Figures 8, 9:
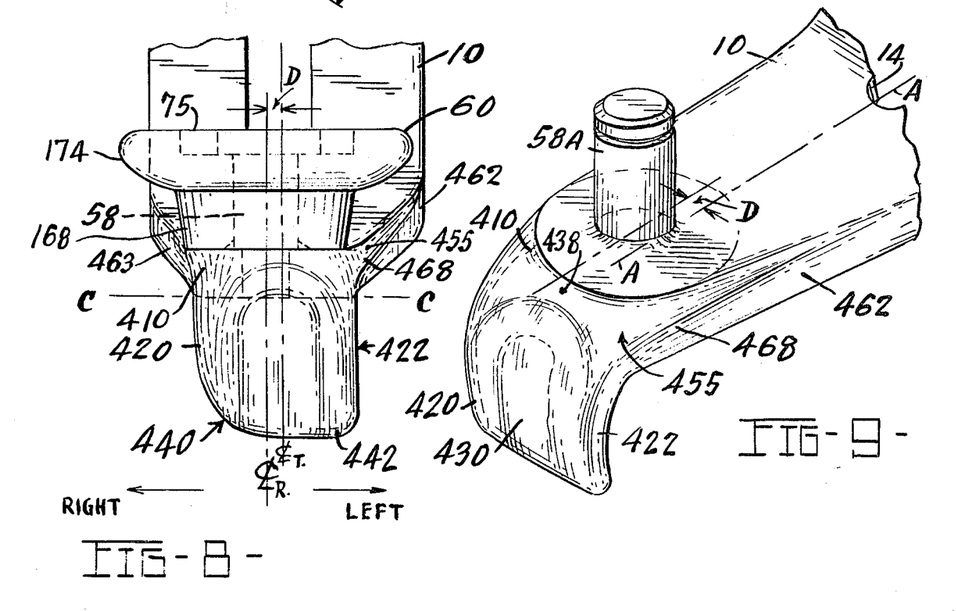
FIG. 8 is a front elevational view of the working end of the subject tool.
FIG. 9 is a perspective view of the working end of the subject tool.

The vertically disposed shaft 58 disposed on the upper surface 155 of the working end 50 of arm 10 is preferably a cylindrical member which is embedded integrally into the working end 50, as shown. In some embodiments, it is considered desirable to use a threaded opening to receive a mating threaded stud on the lower part of shaft 58 in order to secure the shaft in the mounting end 50. In other embodiments, it may be considered desirable to simply cast the shaft and arm 58 and arm as a unitary piece, while in still other embodiments, such as the one shown in FIG. 9, the shaft 58A is locked or otherwise staked securely in an apporpirate cylindrical opening in the upper surface of the mounting end by a split locking ring and washer combination, as shown in FIG. 9. It must be stated, however, that the scope of the subject invention is not to be limited by the precise structural arrangement for shaft 58, as described above.

In FIG. 6, the upper elevational view thereof shows the roller 60 positioned on the vertical shaft 58. As described above, the vertical shaft 58 is slightly offset from the longitudinal central axis A—A so that the roller 60 is offset accordingly and commensurately when viewing the vertical center line of such shaft 58 from a top elevational view, such as in FIG. 6. As can be seen in such FIG. 6, along with FIGS. 7 and 8, the lower portion 168 of roller abuts evenly against the extreme forward or frontal edge 438 of the upper surface 155 of working end 50. More particularly, in the preferred embodiment, the lowest part of the lower portion 168 of roller 60 abuts evenly against such forward edge 438. Additionally, as shown, the remaining parts of the lower portion 168 of roller 60 are generally within the horizontal limits of lateral sides 462 and 463 of the mounting end 50, and above the working surface 155 of such mounting end.

Referring now again to FIGS. 6, 7, 8, and 9, as noted the front end 400 of the arm 10 has integrally appended thereto a hooked-shaped positioning tong 90, which tong is used to surmount the rim edge 110 as shown in the drawings, particularly FIG. 5, during the tire mounting procedure. As shown in the drawings, the front upper portion of tong 90 leads from the extreme upper surface 155 of working end 50 downwardly and rearwardly, as shown in the cross-sectional view of FIG. 7. As can be seen, such tong 90 has an inner rear surface 410 and outer front surface 430. In one preferred embodiment, such positioning tong 90 is formed using an eleven sixteenth inch radius for the inner radius J1 and a seventh eigth inch radius for outer radius J2, with the center point of such radius being at imaginery point K. The outer radius J2 forms the outer extreme surface 430 of tong 90, as shown, while inner radius J1 forms the inner surface 410. As can be seen, the positioning tong 90 is thus formed of an inner and outer surface, from such imaginery point K, which is located at an arbitrary point beneath the lower surface of working end 50, as shown. The exact dimensions of radii J1 and J2 are not to be considered critical to implementation of the subject invention.

Referring specifically to FIGS. 7 and 9, while the outer radius J2 forms the outer surface 430, it is to be noted that such surface 430 radius J2 is represented as the mean radius distance from point K to such outer surface 430. In fact, in the preferred embodiment of the subject invention, the front surface 430 of the tong 90 diminishes in radial depth as it extends from the left to right side of said tong, using the left-right directional orientation of FIGS. 6 and 8. More specifically, the thickness of tong 90 diminishes as it extends from the extreme left side 422 of the tong 90 to the right side. When viewed in cross-sectional configuration of the view shown in FIG. 7, the left side 422 of the tong 90 is shown, and the right side is the most thick of the respective left side 422 and right side 420. Shown in phantom in FIG. 7 is line 420 which represents the right side 420 of tong 90, and the thickness of the right side 420 is the distance between the line 430 and line 420. Thus as observed, the thickness of tong 90 gradually and uniformly decreases as it extends from the left side 422 to to right side 420, and under such structural circumstances the tire mounting process is substantially facilitated.

Moreover, the positioning tong 90, as shown, has a lower right corner 440 and a lower left corner 442, and as shown in the preferred embodiment, the right lower corner 440 has a greater radius sweep than corner 442, although this configuration is not critical to the implementation of the subject invention.

By the structure shown, the tong 90 and the roller 60 cooperatively engage the tire bead in a sweeping, complementary engagement that minimizes any bead damage. With the further complementary radial relationship between the external circumference of the lower portion 168 of the roller 60 and the upper curved surface between tong 90 and side 468 on the left side of the working end 50, the tire roller and remaining portions of the tool 8 requires minimal damaging contact with the tire in the tire mounting process. This latter aspect derives from camming configuration of the upper surface positioning tong 90. This upper surface of tong 90 serves to hold a portion of the tire bead, either the lower bead 140 or upper bead 170, and permits it to slide off in camming manner as the roller 60 moves and completes it function, as described above. While a specific structure for tong 90 has been described for a preferred embodiment, it should not be considered as limiting the scope of the subject invention as set forth in the claims.

Referring now again to FIGS. 7, 8 and 9, as observed, the upper portion of tong 90 merges conformingly in a complementary manner into the upper surface 155 of working end 50, as shown, with the upper left corner 410 and right corner 412 of tong 90 being slightly rounded on their respective upper and side surfaces, as shown. As thus can be seen, the front view of tong, shown in FIG. 8 indicates a resemblance to a U-shaped configuration on the very front face of tong 90.

The left side 462 of mounting end 50 is formed differently than the right side, as shown in FIG. 7. Commencing at point behind the roller 60 near the bend in arm 10 is a sloping straight edge 468 which inclines downwardly from upper surface 155 to the left side 422 of tong 90, as shown. Such edge 468 is on the upper lateral part of extreme side 462 of working end 50, and such edge 468 demarks the upper limit of side 462, with the side 462 extending vertically downwardly to the lower surface 56 of the working end 50, as shown in the drawings. Therefore, in the elevational view of FIG. 7, the left side 462 appears triangular with the apex thereof being at the rear portion of the upper part of tong 90 where such tong meets the lower surface 56 of the working end 50. Laterally inwardly and immediately above edge 468 is a surface 455 which slopes upwardly and inwardly from the edge 468 to the upper surface 155 of working end 50. As seen, such upper surface 455 gradually merges conformingly and in a complementary sweep with the upper rounded left corner 410 of tong 90 and surface 455, as shown. By structuring such surface 455 as shown, when the tire bead engages the left side of the working end 50 of tool 8, the tire meets a radius and surfaces which are complementary to the respective roller radii of roller 60 and thus presents no resistance factors in the mounting process.

The subject invention is utilized as follows. The rim 110 of the tire 100 is placed over the upper horizontal base 130 of the tire mounting machine 220 such that the open center 132 of the rim lies over vertical positioning tang 136. The tool 8 is placed over the rim at a slightly inclined position so that the longitudinal slot 14 is inserted over the positioning tang 136, as shown in FIG. 1.

The demount end 20 of the tool is held upwardly at an inclined position with the bottom surface 56 of the mounting end relatively flat over the upper rim surface. Holding tong 90 is positioned to engage the outer circumference of the rim at a position diametrically opposite to where the demounting end 20 is situated. The under surface of upper portion of the roller 60 engages inner surface 140 of the lower tire bead, i.e. the surface just radially outward of the bead. Then the tool 8 is turned about positioning tang 136 as a fulcrum in a counterclockwise movement for mounting purposes, and while the tool 8 is so moved, the roller surface 174 presses downwardly on inner tire surface 140 to mount the lower bead, while the lower roller surface 168 presses radially outwardly in the lower bead 150 to keep it spaced radially outwardly away from the rim and the tong 90, thus preventing damage to the toe bead in mounting process, as shown in FIG. 6. In this latter position, the roller 60 moves clockwise about the tire bead, as the tool moves in a counterclockwise position, as depicted in FIG. 1.

Figure 10:
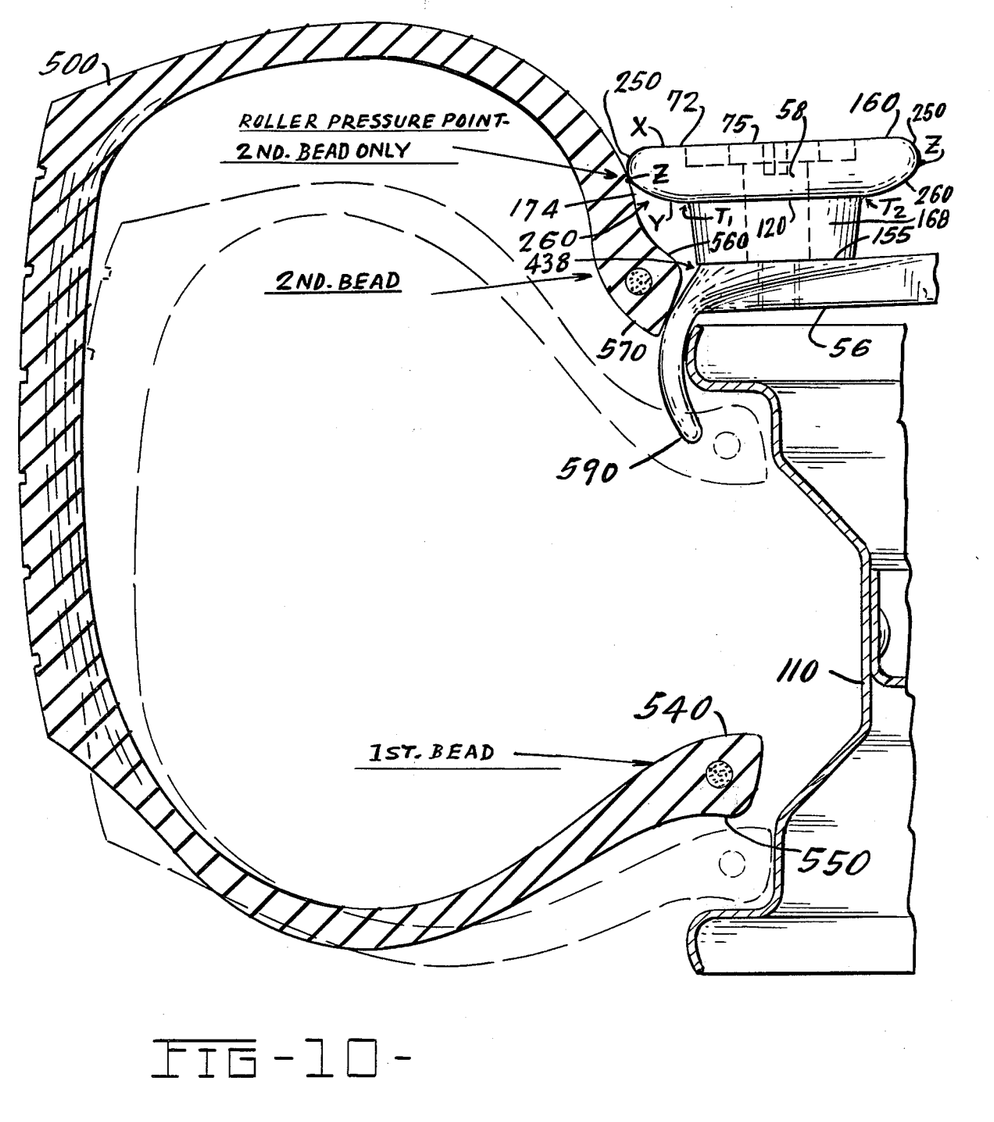
FIG. 10 is a side elevational view of the roller mounting the upper bead.

Once the lower bead is so mounted, the tool is automatically reversed shown in FIGS. 4 and 10 for mounting the upper tire bead. The main difference between the process shown in FIGS. 4 and 10 as opposed to FIG. 5 is that the peripheral surface 174 of roller 60 presses down on the outer tire portion 260 just radially outward of upper bead 170. This serves to mount the upper tire bead while lower portion 168 of roller 60 keeps the bead spaced outwardly so as to prevent tire bead damages during the tire mounting process, and moreover, the subject tool minimizes substantially the forces that act upon the tire bead. Additionally, this mounting tool 8 significantly minimizes the forces and pressures because of opposing angularity on the second or upper bead that must be mounted in the process.

In addition to the foregoing, it must be stressed that by positioning the mounting shaft 58 and thus roller 60 off center relative to the longitudinal central axis A—A of the mounting arms 10, greater efficiency is created. In this latter respect, as the first or lower tire bead is being mounted, the extreme mounting end 50 of the tool 8 acts as a gage that positions itself between the tire rim 110 and the tire bead, thereby causing a lift on the high radius side and is dropped across the diminishing total face radius without the necessity of any part of the tire coming into contact with the roller 60. Additionally, the toe of the tire bead does not become consumed by a radius in the process. Additionally, as the second bead is in the mounting process, the tire bead assumes the same position on the extreme end of mounting end of the tool arm 10, however, the bead in such case is held and moved in a downward movement from this latter position by the action of the largest diameter portion 174 of the roller 60. More specifically, the convex surface 174 of upper portion 72 of roller 60 presses downwardly against the side casing of the tire, and the action of this upper portion of roller 60, with its pressure point action, holds and acts as a trailing arm as the tire is being positioned over the tire rim.

While a preferred embodiment has been described, it shall not limit the scope of the following claims.

I claim:
1. A semiautomatically operated tire mounting tool for mounting a tire comprising:
    (a) a longitudinally extending base arm member of longitudinal extent with an upper and a lower surface, said arm member having a longitudinal central axis and said arm having a mounting end and a demounting end, with a fixed shaft member integrally affixed near the mounting end on the upper surface on said arm member, and wherein said mouting arm has a bend therein such that the upper surface has two portions in different surface planes that intersect one another, and wherein said arm member has a longitudinally extending opening extending over a portion of said arm, with said opening extending completely through said arm from the upper surface to lower surface;
    (b) a rotatably mounted roller affixed on the fixed shaft mounted on said arm member adjacent the mounting end thereof, and wherein the shaft on said mounting end is affixed such that the center thereof is located a distance away from the longitudinal central axis of said arm member, and wherein said roller has a longitudinally extending vertical central axis about which said roller is symmetrically formed and about which vertical axis said roller is rotatably mounted for free rotation relative to said tire mounting tool, said roller comprising:
        (1) a lower portion said lower portion being shaped in the form of an inverted truncated cone with the upper part of said lower portion having an upper and lower part thereof;
        (2) an upper portion with said upper portion on said roller having respectively an upper and lower surface with the lower surface of said upper portion being affixed adjacent to the upper part of said lower portion of said roller in a flush, concentric manner, and wherein said upper portion has a circumferential peripheral lip which is convex, and wherein such convex lip is defined on its external surface by two separate radii, one such generated from a center point which is on the upper surface of said upper portion and one of which is on the lower surface of said upper portion;

(c) a vertically depending positioning tong with lateral sides on the working end of said arm, which tong has a variable thickness on its extent as it extends from one side to the other of said arm member.

2. A manually operated tire mounting tool for mounting a tire comprising:
(a) a longitudinally extending base arm member of longitudinal extent with an upper and a lower surface, said arm member having a longitudinal central axis and said arm having a mounting end and a demounting end, with a fixed shaft member integrally affixed near the mounting end on the upper surface on said arm member, and wherein said mounting arm has a bend therein such that the upper surface has two portions in different surface planes, and wherein said arm member has a longitudinally extending opening extending over a portion of said arm, with said opening extending completely through said arm from the upper surface to lower surface;
(b) a rotatably mounted roller affixed on the fixed shaft mounted on said arm member adjacent the mounting and thereof, and wherein the shaft on said mounting end is affixed such that the center thereof is located a distance away from the longitudinal central axis of said arm member, and wherein said roller has a longitudinally extending vertical central axis about which said roller is symmetrically formed and about which vertical axis said roller is rotatably mounted for free rotation relative to said tire mounting tool, said roller comprising:
(1) a lower portion said lower portion being shaped in the form of an inverted truncated cone with the upper part of said lower portion having an upper and lower part thereof;
(2) an upper portion with said upper portion on said roller having respectively an upper and lower surface with the lower surface of said upper portion being affixed adjacent to the upper part of said lower portion of said roller in a flush, concentric manner, and wherein said upper portion has a circumferential peripheral lip which is convex, and wherein such convex lip is defined on its external surface by two separate radii, one such generated from a center point which is on the upper surface of said upper portion and one of which is on the lower surface of said upper portion;
(c) a vertically downwardly depending positioning tong with a front surface and rear surface, with the rear surface facing the demounting end on the tool member and wherein the front surface and rear surface of such positioning tong are curved surfaces which are generated by radii emanating from a common point, and further wherein the uppermost portion of the curved front surface ends at the lowermost part of the lower portion of said roller.

3. A semi-automatically operated tire mounting tool for mounting a tire comprising:
(a) a longitudinally extending base arm member of longitudinal extent with an upper and a lower surface, said arm member having a longitudinal central axis and said arm having a mounting end and a demounting end, with a fixed shaft member integrally affixed near the mounting end on the upper surface on said arm member, and wherein said mounting arm has a bend therein such that the upper surface has two portions in different surface planes, and wherein said arm member has a longitudinally extending opening extending over a portion of said arm, with said opening extending completely through said arm from the upper surface to lower surface;
(b) a rotatably mounted roller affixed on the fixed shaft mounted on said arm member near the mounting end thereof, and wherein said roller has a longitudinally extending vertical central axis about which said roller is symmetrically formed and about which vertical axis said roller is rotatably mounted for free rotation relative to said tire mounting tool, said roller comprising:
(1) a lower portion said lower portion being shaped in the form of an inverted truncated cone with the said lower portion having an upper and lower part thereof;
(2) an upper portion with said upper portion on said roller having respectively an upper surface and lower surface with the lower surface of said upper portion being fixed adjacent to the upper part of said lower portion of said roller in a flush, concentric manner, and wherein said upper portion has a circumferential peripheral convex lip, as viewed in a side elevational view configuration, and which lip portion extends between the upper surface and lower surface on said upper portion, and wherein such convex lip is defined on its external surface by two separate radii, each generated from a different center point with a different radius of curvature and length of curvature, and wherein the two curves formed on said lip by such two different radii meet at a point, when viewed in cross section, which is most distal on the lip surface from the central vertical axis of the roller member.

* * * * *